US007774430B2

(12) United States Patent
Hughes

(10) Patent No.: US 7,774,430 B2
(45) Date of Patent: Aug. 10, 2010

(54) MEDIA FUSION REMOTE ACCESS SYSTEM

(75) Inventor: David William Hughes, Oxon (GB)

(73) Assignee: Graphics Properties Holdings, Inc., Newark, CA (US)

( * ) Notice: Subject to any disclaimer, the term of this patent is extended or adjusted under 35 U.S.C. 154(b) by 113 days.

(21) Appl. No.: 11/368,625

(22) Filed: Mar. 7, 2006

(65) Prior Publication Data

US 2007/0124382 A1  May 31, 2007

Related U.S. Application Data

(60) Provisional application No. 60/735,962, filed on Nov. 14, 2005.

(51) Int. Cl.
*G06F 15/16* (2006.01)
(52) U.S. Cl. ...................... 709/219; 709/205
(58) Field of Classification Search ................ None
See application file for complete search history.

(56) References Cited

U.S. PATENT DOCUMENTS

| | | | |
|---|---|---|---|
| 5,491,813 A | | 2/1996 | Bondy et al. |
| 5,666,030 A | * | 9/1997 | Parson ...................... 315/169.3 |
| 5,682,326 A | * | 10/1997 | Klingler et al. .......... 715/500.1 |
| 5,774,720 A | * | 6/1998 | Borgendale et al. ......... 719/329 |
| 5,889,951 A | | 3/1999 | Lombardi |
| 6,738,075 B1 | * | 5/2004 | Torres et al. ................. 715/723 |
| 6,774,919 B2 | * | 8/2004 | Miller et al. ................. 715/721 |
| 7,178,106 B2 | * | 2/2007 | Lamkin et al. .............. 715/716 |
| 7,224,404 B2 | * | 5/2007 | An et al. ..................... 348/584 |
| 2003/0142625 A1 | * | 7/2003 | Wan et al. ................... 370/235 |
| 2003/0206553 A1 | * | 11/2003 | Surcouf et al. .............. 370/419 |
| 2004/0212589 A1 | | 10/2004 | Hall et al. |
| 2005/0041736 A1 | * | 2/2005 | Butler-Smith et al. .. 375/240.01 |

(Continued)

OTHER PUBLICATIONS

U.S. Appl. No. 11/368,452, filed Mar. 7, 2006, David W. Hughes, Silicon Graphics, Inc.

(Continued)

*Primary Examiner*—Vivek Srivastava
*Assistant Examiner*—Minh-Chau Nguyen
(74) *Attorney, Agent, or Firm*—Sterne, Kessler, Goldstein & Fox PLLC

(57) ABSTRACT

The present invention is a system that receives data in different formats from different devices/applications in the format native to the devices/applications and fuses the data into a common shared audio/video collaborative environment including a composite display showing the data from the different sources in different areas of the display and composite audio. The common environment is presented to users who can be at remote locations. The users are allowed to supply a control input for the different device data sources and the control input is mapped back to the source, thereby controlling the source. The location of the control input on the remote display is mapped to the storage area for that portion of the display and the control data is transmitted to the corresponding device/application. The fusion system converts the data from the different sources/applications into a common format and stores the converted data from the different sources in a shared memory with each source allocated a different area in the memory. A combined window like composite representation of the data is produced and also stored in the memory. The combined representation is transmitted to and can be controlled by the users.

18 Claims, 8 Drawing Sheets

U.S. PATENT DOCUMENTS

2005/0086612 A1     4/2005    Gettman et al.
2005/0149251 A1     7/2005    Donath et al.
2005/0281276 A1*   12/2005   West et al. .................. 370/411

OTHER PUBLICATIONS

PCT International Search Report, mailed Mar. 5, 2008 and issued in related International Patent Application No. PCT/US 07/05715.

PCT International Search Report, mailed Mar. 6, 2008 and issued in related International Patent Application No. PCT/US 07/05717.

U.S. Appl. No. 11/368,451, filed Mar. 7, 2006, David William Hughes, Silicon Graphics, Inc.

U.S. Appl. No. 11/368,452, filed Mar. 7, 2006, David William Hughes, Silicon Graphics, Inc.

International Search Report, mailed May 8, 2008 and issued in related International Patent Application No. PCT/US07/05716.

International Preliminary Report on Patentability, mailed Sep. 18, 2008 and issued in corresponding International Patent Application No. PCT/US2007/005716.

International Preliminary Report on Patentability, mailed Sep. 18, 2008 and issued in corresponding International Patent Application No. PCT/US2007/005717.

International Preliminary Report on Patentability, mailed Sep. 18, 2008 and issued in corresponding International Patent Application No. PCT/US2007/005715.

"Getting Started With the Explorer 8000 and 8000HD DVR", Scientific-Atlanta, Mar. 2004, pp. 12.

\* cited by examiner

MEDIA FUSION REMOTE ACCESS SYSTEM

CROSS-REFERENCE TO RELATED APPLICATION(S)

This application is related to and claims priority to U.S. provisional application entitled Media Fusion Remote Access having Ser. No. 60/735,962, by Hughes, filed Nov. 14, 2005, to U.S. application entitled Flexible Landscape Display System For Information Display And Control having Ser. No. 11/368,452, by Hughes, filed Mar. 7, 2006, and to U.S. application entitled Integration Of Graphical Application Content Into The Graphical Scene Of Another Application having Ser. No. 11/368,451, by Feth et al, filed Mar. 7, 2006 and all incorporated by reference herein.

BACKGROUND OF THE INVENTION

1. Field of the Invention

The present invention is directed to a system that fuses two or more data streams from different devices into a single environment and then provides that environment to users that can be remotely located and allows the users to control the different devices that provide the data streams from their remote locations.

2. Description of the Related Art

Working in virtual environments often is highly heterogeneous in nature and this makes it difficult to access all the information required. An intuitive natural workspace is required to enable better faster decision-making and improved time to insight. Remote access to visual streams and complete scenarios is an essential part of a networked working environment. Interaction and control of a collaborative environment by all participants is a need in the field of complex problem solving. Remote sharing of a collaborative environment is also a problem today. Presenting large amounts of complex data in a timely fashion during collaboration is also needed. Making teleconferencing, large complex datasets and tools to solve problems presented to the collaborators is also an issue that is wanting of a solution. Current technologies do not adequately support these issues in an integrated and scalable architecture.

What is needed is a system that will provide a solution to these problems.

SUMMARY OF THE INVENTION

It is an aspect of the embodiments discussed herein to provide a system that allows remote access to a shared, collaborative workspace or environment where many different data sources are fused into a composite.

It is also an aspect of the present invention that multiple users can access the data streams held in shared memory where their view of the data does not have to be the same and can be totally or partially inclusive or even mutually exclusive in terms of the data that they view and interact with and where streams are shared, visualization and control is also shared.

It is another aspect of the embodiments to provide a system that allows all users to control the different applications that have been fused into the common environment.

It is a further aspect of the embodiments to allow different tools to be presented to the users in a fashion that is familiar to those that use such tools.

The above aspects can be attained by a system that receives data in different formats from different devices and fuses the data into a common shared audio video collaborative environment. The common environment is presented to users who can be at remote locations. The users are allowed to supply control inputs for the different device data and the control input is mapped back to the source controlling the source. The fusion system combines the data from the different sources using a shared memory and display segregation within the memory for the different data sources. A combined window like representation is produced and also stored in the memory. The combined representation is transmitted to the users.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

The embodiments of this invention provide a workspace that is heterogeneous in nature and, by using digital media technologies and media fusion capability, creates a seemingly homogeneous workspace that is fully controllable for all the different input streams. This fused environment is made available over a network while retaining full control and interaction with the underlying applications. The extensible nature of this system means that fused displays can become streams in other media fusion environments down the chain, while retaining control and interaction throughout.

The embodiments provide transparent universal access to visual resources. And provide the ability to ingest, fuse, display and distribute large amounts of heterogeneous visual information. This could service an immersive visualization facility or act as a standalone visual server and processor. Large amounts of visual data are ingested into the system and presented in an advanced fusion environment, providing intuitive user interaction and enables the user to access a complete common operating picture of the problem at hand. In addition the embodiments provide the opportunity to integrate inter-personal communications technologies, such as video conferencing with other types of data both in 2D and 3D. By using collaborative technologies, such as Visual Area Networking, it is designed to bring people and data together to enable accelerated workflow and better inform.

Figure 1:
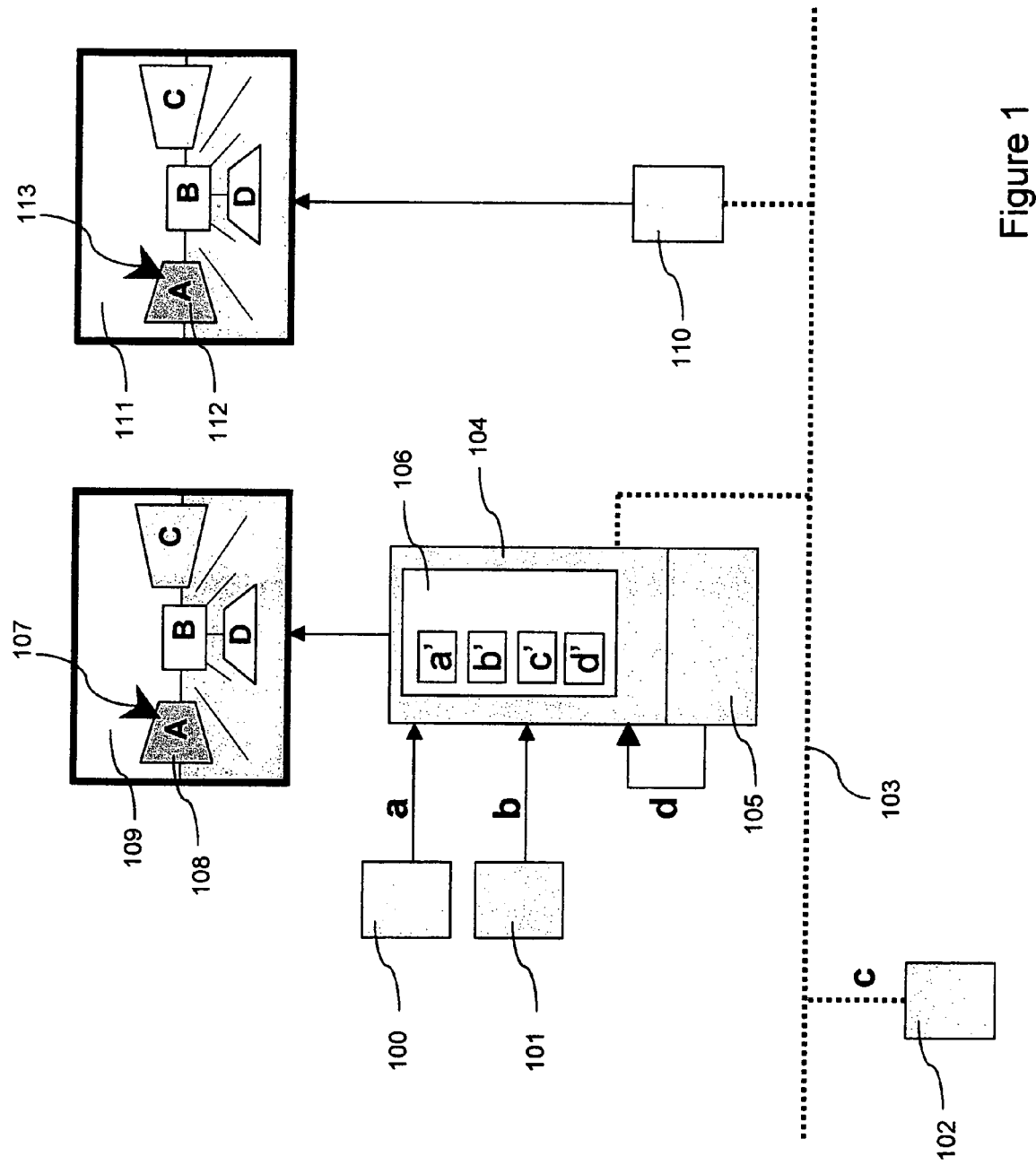
FIG. 1 illustrates an embodiment of the components of a system of the present invention.

As depicted in an embodiment of the invention in FIG. 1, the system includes a number of different information sources that are combined or fused into a visual environment that is then transmitted to local and remote locations where the visual environment is presented to various users where there may be multiple visual environments allowing multiple remote users to view and link to streams in shared memory.

As depicted in FIG. 1, 100 and 101 are physical visual devices, such as a PC or video player that are physically connected to a fusion system 104. The PC might be executing a CAD design application, a spread sheet application, a word processing application or any other application that can produce a video (and audio) display. The devices can also be much more powerful systems such as supercomputers capable of rapid complex calculations, such as for weather mapping. These two devices 100 and 101 provide media feeds a and b in a native format of the applications being executed. 102 is a similar device to 100 or a visual server that is connected to a network 103 providing a media feed c. The device 105 is a graphical generation system that is part of the fusion device 104, which is generating a media feed d, which is then ingested back into the fusion device 104.

Thus media information is fed into the fusion system 104 from different sources, local 100 and 101, native 105 or networked 102. In this example the fusion system 104 is ingesting media feeds a, b, c and d.

The fusion system 104 imports and converts all of the ingest feeds into a common format, which is then held in the memory system 106 on the fusion system 104. A typical common format is values for pixels in red, green, blue and alpha transparency values. This may be in compressed or uncompressed form and would be accompanied by associated metadata describing attributes such as date, source, original format etc for example. Each of the sources (applications) has a dedicated memory area that is used to store the converted media (display contents and sound) as produced by the applications/sources. The media feeds a, b, c and d are now represented in the common format as a', b' c' and d'. These are then fused into a common view that could be either 2D or 3D in appearance. To do this each of the media areas can be assigned a dedicated display window in a windows type operating system. Here it is represented in a three-dimensional (3D) landscape 109. The fusion system generates a composite view and renders that to a fused display environment 109. For example, the system can create a display that displays each of the windows in a different area of a typical display screen. This composite display is then provided to the users both locally and remotely located where it is displayed in the common format.

This composite view can enable each user to view, interact with and control the applications and devices via the media streams being fed into the fusion system; a, b, c and d. Control of the source application is passed back through the fusion system to the source devices (100, 101, 102 or 105) whether local, native or networked. For example, if a user selects ("clicks-on") a menu in one of the windows of the display, the location of the cursor (the control input) is passed back to the system 104. The system 104 maps the control input to the dedicated area for the particular media feed, this location within the media feed or display provided by the media application is transmitted back to the application (100, 101, 102 or 105). The application treats the input as if it were a control input from the local device, such as the mouse of the PC 100. The application performs the appropriate control operation based on the control input such as performing a selected menu operation, and produces a new version of the media stream. This new stream is provided to the system 104 where it is fused into the composite view. Thus, a user can interact via the screen cursor, or other external device, at position 107 passing control stream a back to device 100. If the fused display is in 3D mode, the cursor position is mapped from 2D space in display 109 to 3D space in the 3D world represented and then back to the true 2D space in the application being driven by device 100.

The system can take the visual output of the fusion engine and serve this over the network to a remote client 110. The stream sent to client 110 can be compressed or not compressed. This client 110 can be a PC or some other device that can decompress the visual stream and display it as well as pass back control to the fusion server. The client 110 can display a version of the fused landscape 111, that is a representation of the original one 109. Moreover, the remote serving system retains the full interaction capability with both the fused environment and the individual application 112 that is connected back to the source device 100. A cursor in position 113 would produce the same control as one in position 107.

This provides a collaborative capability where two or more users can interact with not just the whole fused environment but also the individual applications and devices that are part of the display. Those users can either be at the fusion system or at the remote client(s), in this case 110 via display 111. Alternatively, all of the users could be remote with no users needing to be at the original fusion system 104. In this case it is acting as a pure fusion server or fusion gateway.

A further embodiment is where multiple remote collaborators can access the streams held in shared memory and visualize and control those streams. Those collaborators can access the same, some of or totally different streams. This would enable a single server to serve either a common view of the same data, a partial view where users need to see some of the same and some different data and also a capability to enable multiple unconnected users to access independent data streams.

Figure 2:
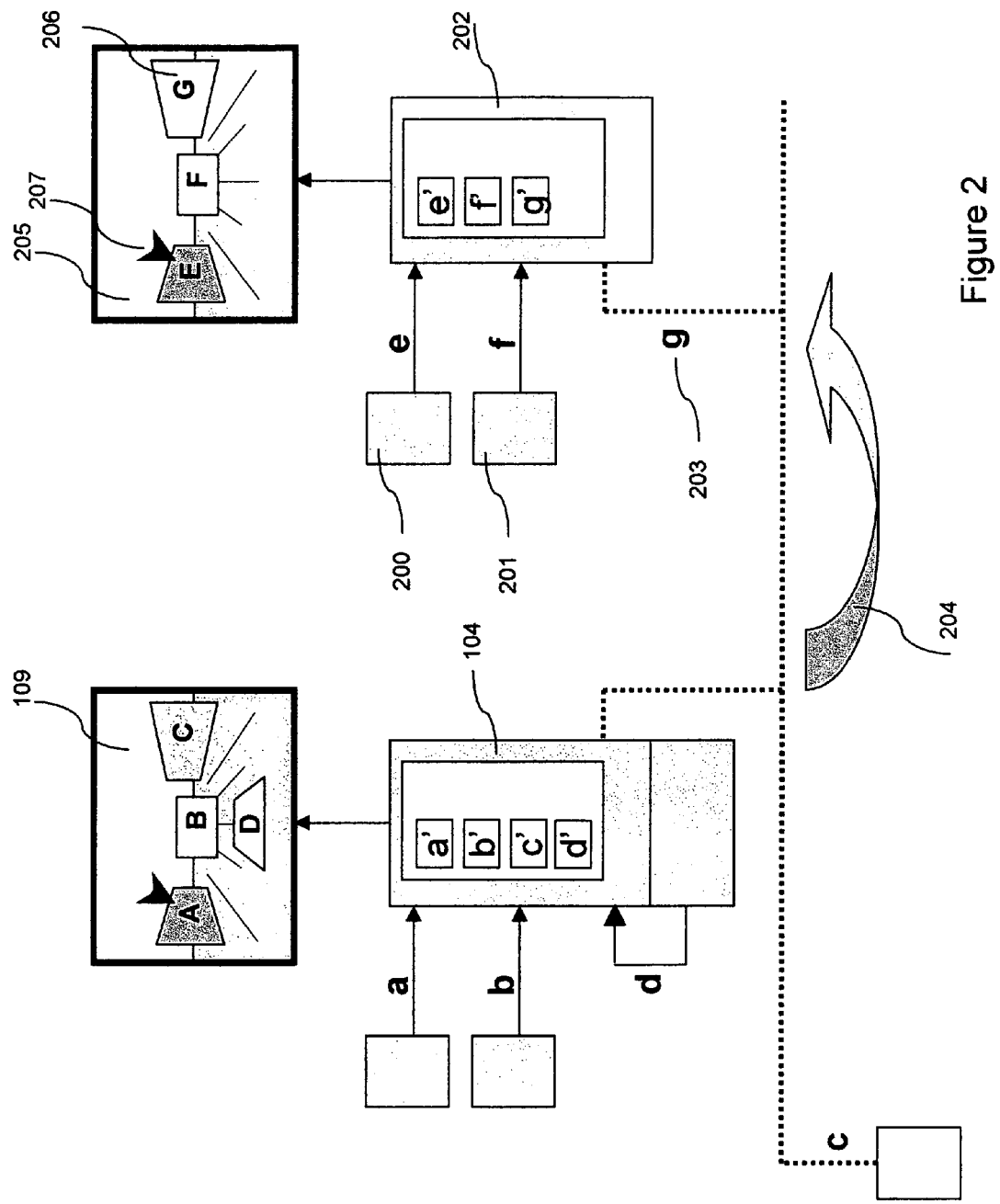
FIG. 2 depicts an extension embodiment where a fused environment is made a part of another environment fusion.

An additional embodiment is depicted in FIG. 2 and is an extension where the output 109 from the first fusion engine 104, which is packaged and streamed over the network and becomes a network stream 203, here referred to as media stream g. Instead of being ingested into a standard client as before (110) this is now ingested into another fusion engine 202. This fusion stream becomes g' in the shared memory on this second fusion engine. This can then be combined with additional media streams, here shown as e and f fed from local devices 200 and 201, respectively. Additional streams could be added from either the network or the native fusion engine system as before. These are fed into the fusion engine 202 and displayed in the output display, which can be either a 2D or 3D representation of the fused environment 205.

Thus, the original fused media display 109 is now represented in the second fused display 205 represented in the window 206 as media stream G. A fused display from one fusion engine can become a stream in it's own right (in this case stream g) which can be visualized on its own via a client device (110 in this case) or included in another fusion environment, in this case device 202 and onto display 205.

Full interactive functionality and control is supported both in the fused display 205 and for the applications and streams running in the windows E, F and G. As the cursor 207 or external control device addresses the applications in E and F, the source applications on devices 200 and 201 respectively will be controlled. In the case of G the cursor at position 207, or external device, will control both the fused environment 109 and any applications or devices embedded within it, in this case streams a, b, c and d.

Figure 3:
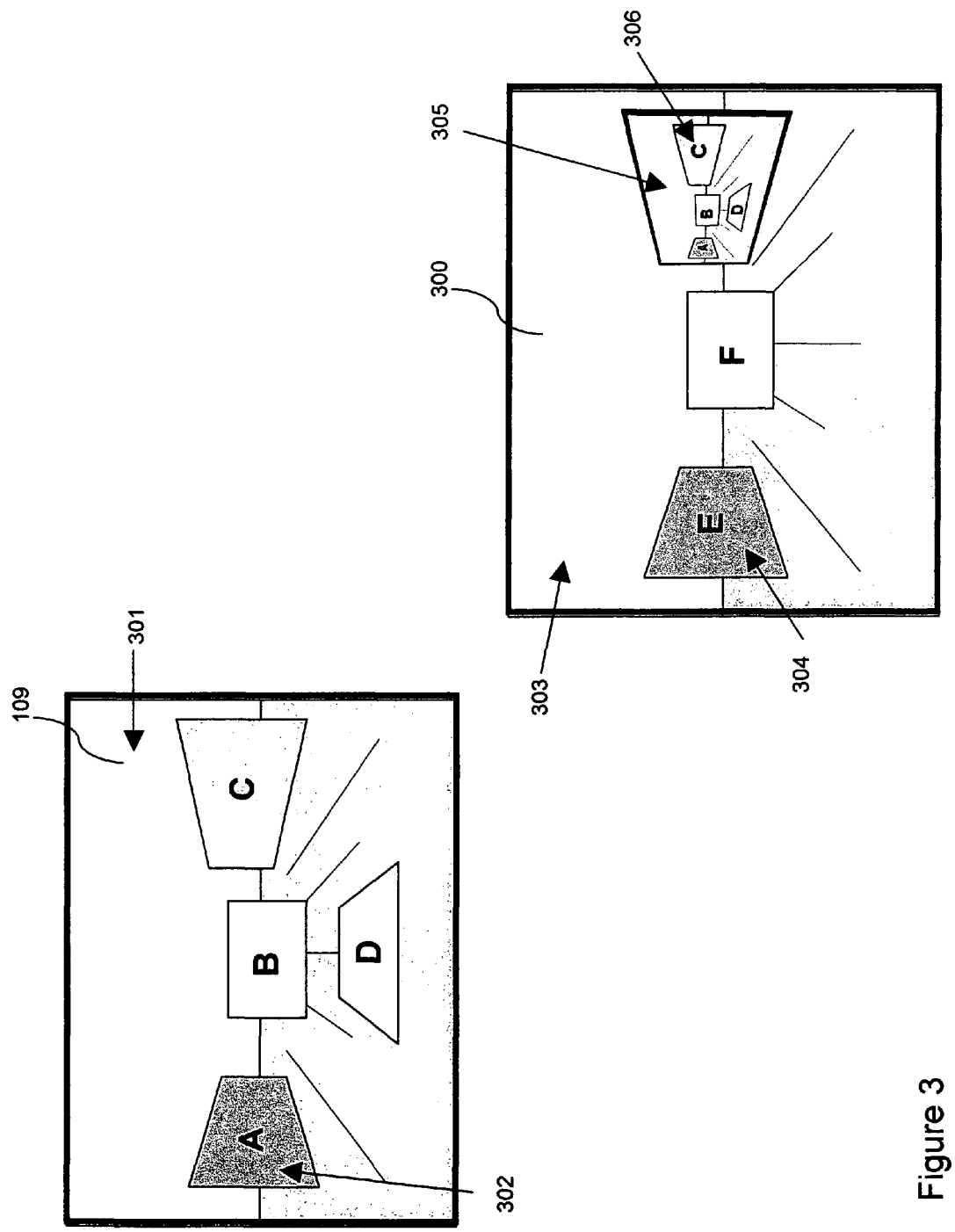
FIG. 3 shows a same environment being presented in a different way to different users.

As depicted in FIG. 3, where in the second example with two fusion display engines, where the first produces the fused display output 109 and the second shown as 300, which is the same as 205, except that now the contents of stream G are being shown in detail. It can be seen that stream G actually contains the content of the fused display 109 embedded into the fused display 300. Thus, the one fused display is nested inside of a second fused display.

In this situation, control can also be passed back to the source application or device. Thus, if the cursor is positioned at position 301, not over an active media stream, the input will go to control the fused environment 301. If the cursor is over a particular stream, as is shown at position 302 for media stream A, it will control the application or device feeding this stream, in this case device 100.

Now looking at the second fused display being produced by the display fusion engine 202, if the cursor is at the position 303, it will control the fused environment being fed by 202. If the cursor is at position 304, it will control the device that is feeding stream E, i.e. device 200. If the cursor is at position 305, it will control the environment for fused display 109 and thus control is directed back to the fusion engine 104. If the cursor is at position 306, control will be passed back to the source device for stream C, which in this case is device 102. Potentially any of the streams in the original fused display could also have been fused displays of themselves. So, for example device 102 could actually be a 3rd fusion engine and, thus, the content of the stream C could contain multiple streams as well, each of which could be individually controlled from the fusion engine 202 and the fused display 300. This can continue to happen recursively.

Thus, the embodiments of this invention enables multiple different devices and streams to be merged into a single workspace and then shared, viewed and controlled in either a client or another fused display. Control of each stream is passed back to the source device or stream server. This can repeat recursively through a potential cascade of fusion engines while throughout enabling control to be passed back to the source device or stream.

A further aspect of the embodiments of this invention is as follows. Rather than the fusion engine 104 sending a fused display over the network to the receiving client 110, the individual streams, in this case any or all of a', b', c' and d' can be transmitted to a client that then displays them in the intermediate form from the shared memory on 104. These can then be presented in a different format and layout from that as shown in 109. None or any or all of these streams can be represented while not affecting the display at 109. Thus, this is a method of making individual streams available across the network for subsequent display or redistribution.

Figure 4:
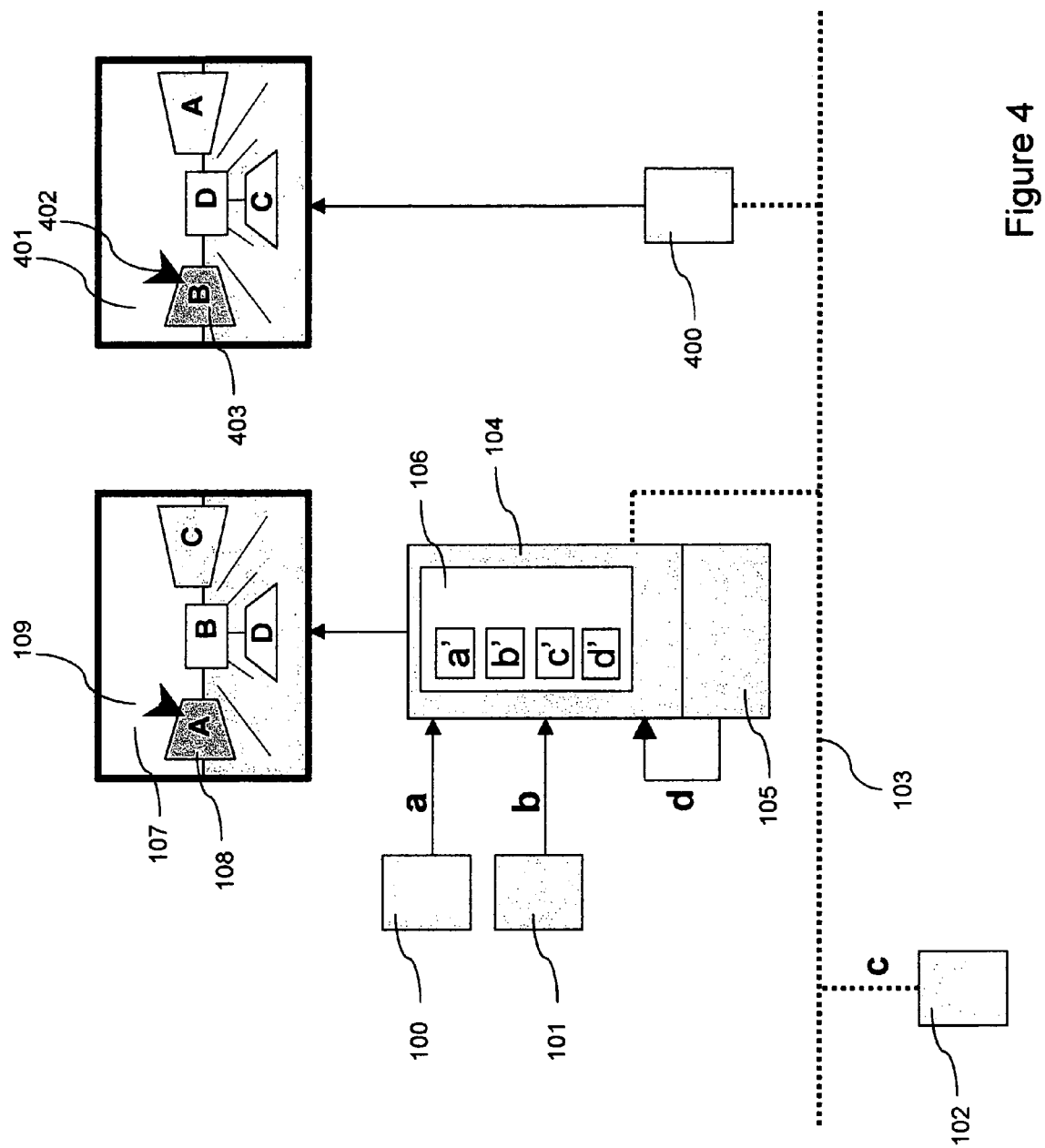
FIG. 4 depicts another environment presentation.

In FIG. 4, the fused display 401, which could be 2D or 3D, is shown in a different format from 109, where stream B is now represented at position 403. Cursor control at position 402 will control stream B and device 101 as in FIG. 1, except now the fused display format 401 is a different layout from 113.

Figure 5:
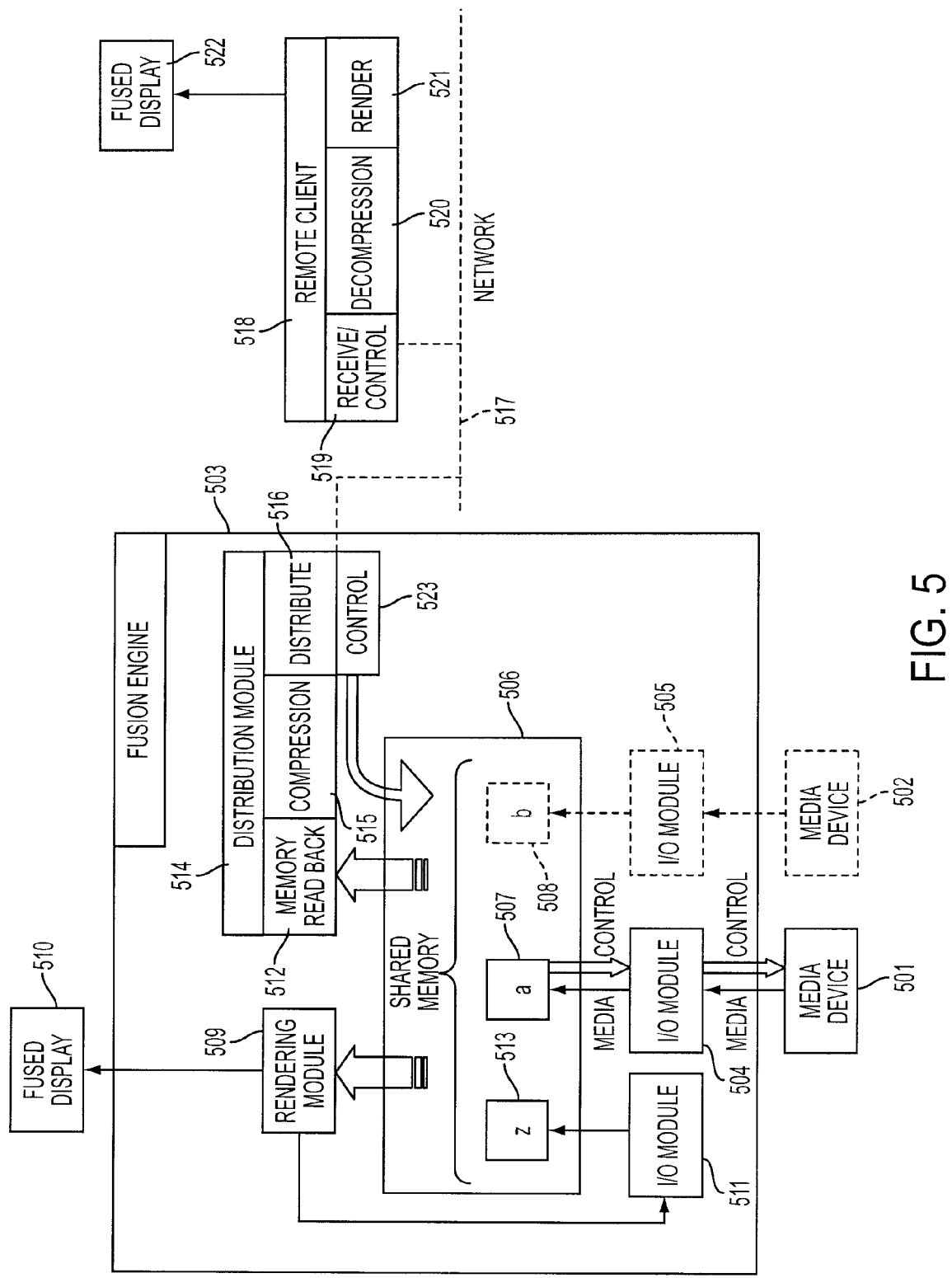
FIG. 5 depicts the fusion engine in more detail.

FIG. 5 illustrates the fusion system 104 in more detail. Media devices 501 and 502 and corresponding streams are fed into the fusion engine 503 via the I/O modules 504 and 505. Multiple streams and devices can be supported. Here streams a and b are shown. The media streams are converted into a common format and imported into shared memory 506 by the I/O modules. Different I/O modules will support different types of media device and stream. Each of the streams is allocated it's own storage area 507 and 508, respectively.

A rendering module 509 will take a selection of these streams from memory 506 and use them to build a fused display, such as the multiple windows fused display previously discussed, which is then sent out to the graphical interaction device 510.

The fused display produced by module 509 is then captured either by an I/O module 511 which will capture the stream via pixel capture or hardware or by memory readback 512 where the pixels are read from the frame buffer of the graphics card and read back into shared memory. These are made available as an additional stream Z stored in a dedicated portion 513 of memory 506.

A distribution module 514 can then read from memory 506 selected streams and or the fused display Z, compress 515 them using a variety of conventional codecs and then distribute 516 this data over a network 517.

A remote client 518 will pick up 519 the distributed streams, decompress 520 and then render 521 the data to a remote fused display 522.

Control for the source application or device is passed back directly from the fusion engine fused display 510, or from the remote client fused display 522 via the network 517 to a control input receiver 523, and then through the shared memory 506 and I/O module (501 or 502) back to the appropriate source application or device.

Figure 6:
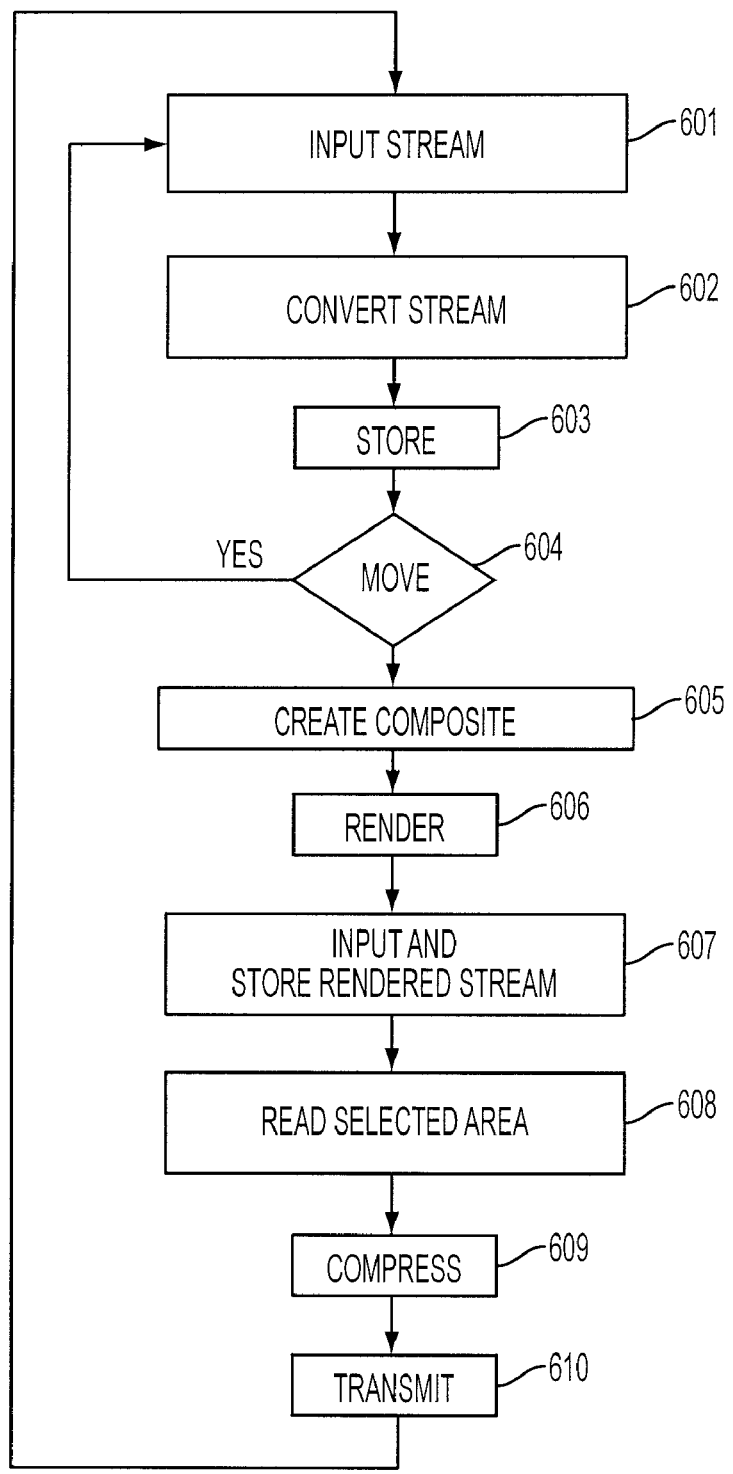
FIG. 6 illustrates fusion operations of the fusion engine.
Figure 7:
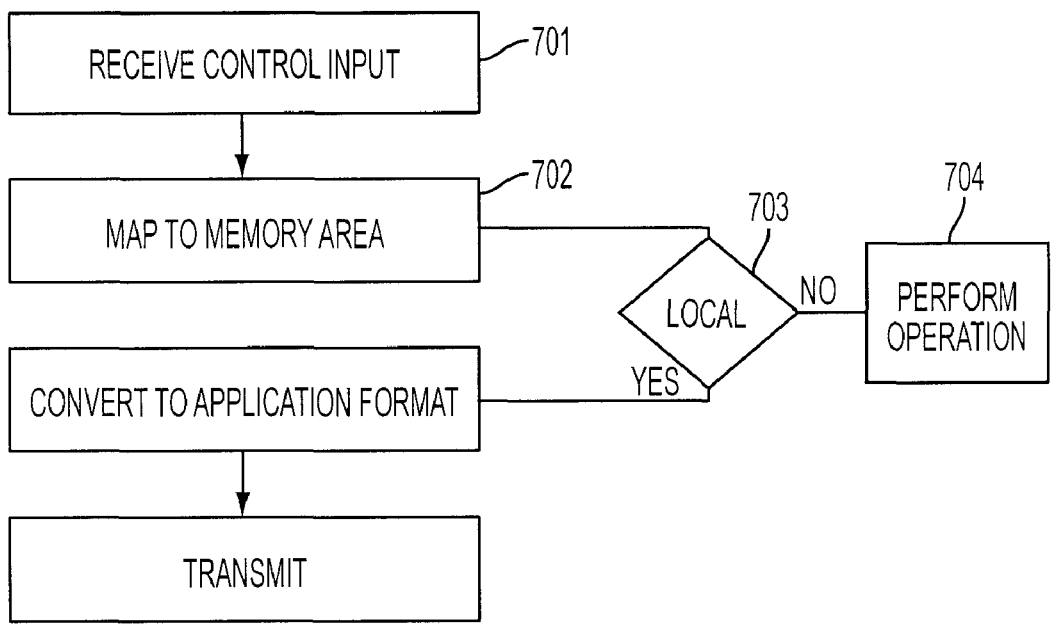
FIG. 7 shows control data passing operations associated with passing a control operation from a remote display to an application producing the data of the control operation.

FIG. 6 illustrates the operations of the fusion engine when creating a fused display in more detail. For simplicity of discussion, the operations in FIGS. 6 and 7 are shown sequentially even though, as will be recognized by one of skill in the art, one or more operations may be happening substantially in parallel. For example, input streams, due to the non-synchronous nature of the applications producing them, may arrive at the same time and the data of the streams may be converted and stored substantially simultaneously based on I/O interrupts. FIG. 6 depicts the input 601 of a stream, the conversion 602 of that stream into the common format and then the storage of that stream 603 in the shared memory 506. Once all of the streams have been received, converted and stored 604, that is, once the display cycles of the input devices have all finished, the system creates 605 the composite display as specified, such as by providing the data to corresponding windows, and renders 606 the fused display. The rendering can be via a number of different techniques where ray tracing is used for models, such as a CAD part. This display is output and also captured and stored 607 in the common memory 506. The system, then, reads 608 the particular area of the memory 506 selected, the fused display area 513 or one or more of the individual media feeds 507 and 508. The data from the selected memory area is compressed 609, as needed, and transmitted. At the remote site, the display data that has been transmitted is input, decompressed and displayed.

FIG. 7 illustrates the operations performed for a control signal (data) that is transmitted from a remote display. When a control input is received 701, the control action, such as a mouse click, and the location of the action in the fused display in the remote display device are received. The location is mapped to the corresponding location in the memory 506, such as within the fused-display display area 513. This location in area 513 is then mapped to either the fusion display control space or to one of the media stream areas 507 and 508. This identifies the control input as for the fusion system or for one of the original media feeds. If it is for the fusion system 703, the local operation is performed 704. If the control input is for one of the media feeds, the location in the display area for that media feed and the control operation are converted 705, as needed, into the application format of the media feed, and transmitted. The particular application performs the requested operation and the display area for the application in memory 506 is updated accordingly. The system then awaits another control input.

Figure 8:
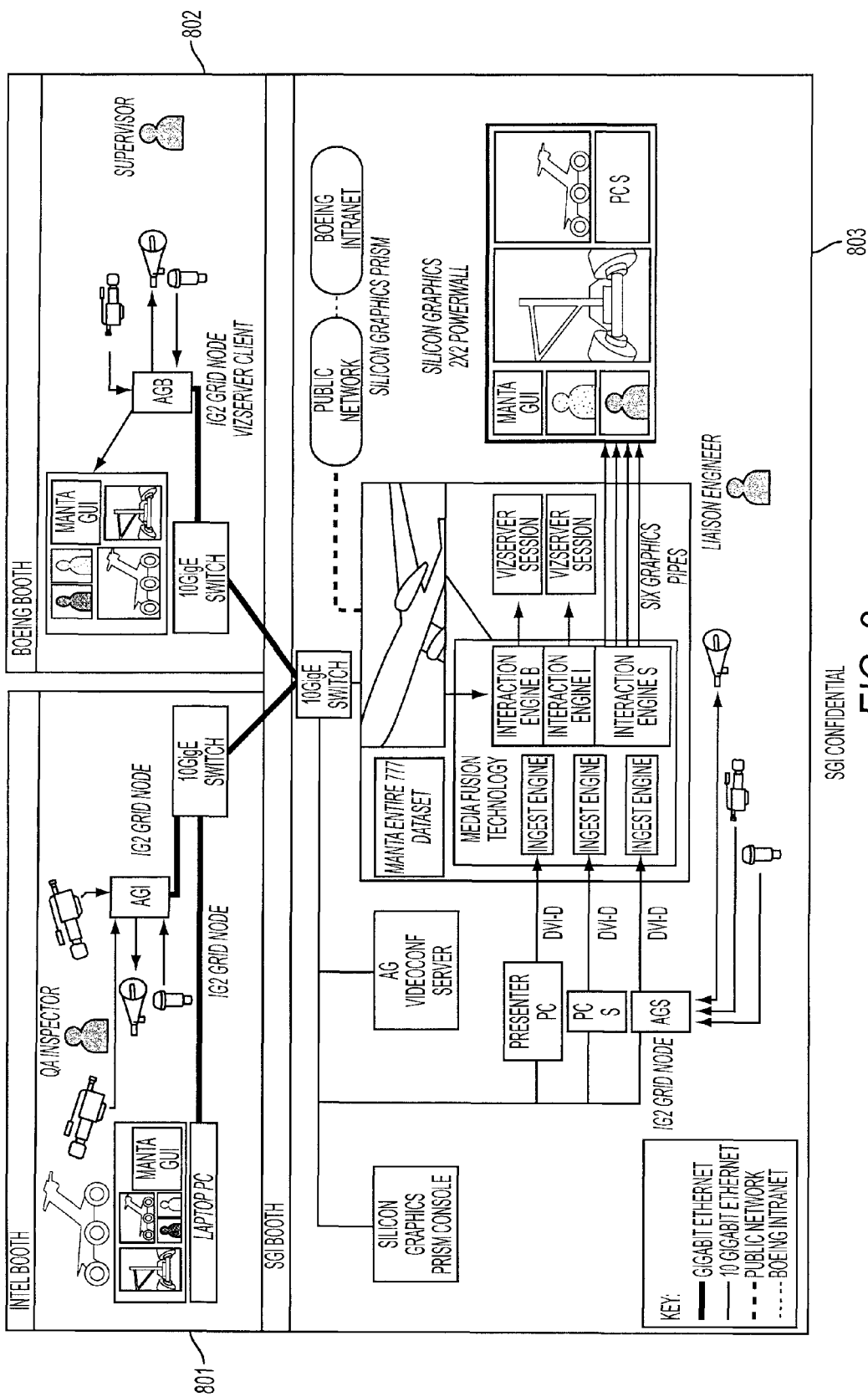
FIG. 8 shows an example of a system.

FIG. 8 depicts an example system where a laptop system 801 and a desktop system 802 are interacting with a fusion system 803 that provides a powerwall type display and where the fused display can include live and CAD views of a part of a complex system being inspected, and video (audio) conferencing views of the individuals involved in the interaction or as needed a view of the actual part or process being examined and an intranet feed from a system that includes the high resolution part model. The data is exchanged over a high speed (10 GB) network and six graphics pipes, in addition to the feeds to the remote sites, are provided. View and control of the streams on the fusion server can be fully inclusive, partially inclusive or totally exclusive. This can be changed during the session and the users have the ability to attach to and detach from available streams as well as the ability to generate new streams from any of the collaborative locations.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A system, comprising:
   a combining system configured to:
      receive data from a first data source device in a first format and a second data source device in a second format different from the first format, and
      create a combined representation comprising a first representation area for data from the first data source device and a second representation area for data from the second data source device;
   a presentation device configured to present the combined representation and further configured to receive a control action associated with a location within the combined representation; and
   a shared memory configured to map the control action to a shared memory region corresponding to a control target device, wherein the location of the control action identifies the control target device comprising:
      the first data source device, if the location is within the first representation area, or
      the second data source device, if the location is within the second representation area, and
   wherein the combining system is further configured to transmit a control input corresponding to the control action and the location within the corresponding representation area to the control target device.

2. The system as recited in claim 1, wherein the shared memory is further configured to store the data from the first and second data source devices.

3. The system as recited in claim 2, wherein the shared memory comprises first and second data source storage areas dedicated to the data of the first and second data source devices respectively.

4. The system as recited in claim 3, wherein the shared memory further comprises a representation storage area configured to store the combined representation of the data.

5. The system as recited in claim 4, wherein the combining system is configured to transmit the combined representation from the representation storage area to the presentation device.

6. The system as recited in claim 1, wherein the presentation device is connected to the combining system across a network.

7. The system as recited in claim 1, wherein the combining system is configured to convert the data from the first and second data source devices into a common format.

8. The system as recited in claim 1, wherein the combining system is configured to render the data from the first and second data source devices into a display.

9. The system as recited in claim 1, wherein the corresponding representation areas comprise display windows.

10. The system as recited in claim 1, wherein the combining system is configured to map the control input to an application control input for the control target device.

11. The system of claim 1, further comprising:
    a second presentation device configured to present the combined representation,
    wherein the combining system is further configured to transmit the control input and the location to the control target device regardless of whether the control action is performed on the first presentation device or the second presentation device.

12. The system of claim 1, wherein the presentation device is further configured to allow the creation of views of the data.

13. The system of claim 1, wherein the control target device comprises:
    the first data source device, if the location is within the first representation area,
    the second data source device, if the location is within the second representation area, or
    the combining system, if the location is not within the first or second representation areas.

14. A method, comprising:
    receiving data in different formats from first and second data source devices;
    creating a combined representation of the data;
    presenting the combined representation at different locations;
    receiving a control action corresponding to a location within the combined representation;
    mapping the control action to a region of a shared memory corresponding to a control target device comprising one of:
       the first data source device, if the location is within a first representation area of the combined representation, or
       the second data source device, if the location is within a second representation area of the combined representation; and
    transmitting a control input corresponding to the control action to the control target device.

15. The method as recited in claim 14, further comprising:
    mapping the control input to an application control input for the control target device; and
    routing the application control input to control target device.

16. The method as recited in claim 14, wherein the creating comprises:
    storing the data from the first and second data source devices in first and second dedicated storage areas of the shared memory;
    providing the data of the areas to corresponding windows for a display;
    rendering the windows as a common display;
    storing the common display in a representation storage area of the shared memory; and
    transmitting the common display of the representation storage area to the different locations.

17. A system, comprising:
    a combining system configured to:
       receive data from a first data source device in a first format and a second data source device in a second format different from the first format, and create a combined representation comprising a first representation area for data from the first data source device and a second representation area for data from the second data source device;

at least two presentation devices, each presenting the combined representation; and shared memory configured to:

provide multiple simultaneous accesses to the combined representation in the shared memory, and receive a control input associated with a location within the first or second representation areas, wherein the control input is mapped to a region of the shared memory corresponding to a control target device, the control target device comprising:

the first data source device, if the location is within the first representation area, or the second data source device if the location is within the second representation area, and wherein the combining system is further configured to transmit the control input and the location within the corresponding representation area to the control target device.

18. A non-transitory computer readable storage medium having computer-executable instructions stored thereon that, if executed by a computing device, cause the computing device to perform a method comprising:

receiving data in different formats from first and second data source devices;

creating a combined representation of the data;

presenting the combined representation at different locations;

receiving a control action corresponding to a location within the combined representation;

mapping the control action to a region of a shared memory corresponding to a control target device comprising one of:

the first data source device, if the location is within a first representation area of the combined representation, or the second data source device, if the location is within a second representation area of the combined representation; and transmitting a control input corresponding to the control action to the control target device.

* * * * *